United States Patent [19]

Sebzda, Sr.

[11] Patent Number: 4,870,242
[45] Date of Patent: Sep. 26, 1989

[54] CLAMPING MECHANISM FOR SECURING AN EDM ELECTRODE HOLDER IN A HYDRAULIC CHUCK

[76] Inventor: Jack Sebzda, Sr., 7 Schuyler Ave., Pequannock, N.J. 07440

[21] Appl. No.: 203,080
[22] Filed: Jun. 7, 1988
[51] Int. Cl.[4] .......................... B23H 1/04; B23B 31/30
[52] U.S. Cl. ..................................... 219/69.15; 279/4
[58] Field of Search ................. 219/69 E; 279/1 L, 4, 279/118

[56] References Cited

U.S. PATENT DOCUMENTS

| | | |
|---|---|---|
| 2,567,436 | 9/1951 | Lampe . |
| 2,574,281 | 11/1951 | Olson . |
| 3,212,347 | 10/1965 | Robeson . |
| 3,237,463 | 3/1966 | McPherson . |
| 3,731,942 | 5/1973 | Buck . |
| 3,769,761 | 11/1973 | Ohsima . |
| 3,912,251 | 10/1975 | Fraser et al. . |
| 4,049,282 | 9/1977 | Yearsley ................................ 279/50 |
| 4,128,043 | 12/1978 | Grassi .................................... 279/51 |
| 4,139,206 | 2/1979 | Knohl ................................... 279/1 C |
| 4,318,293 | 3/1982 | Heymanns Lothar et al. ... 279/2 A |
| 4,387,907 | 6/1983 | Hiestand ................................... 279/4 |
| 4,533,287 | 8/1985 | Hagemeyer et al. . |

FOREIGN PATENT DOCUMENTS

| | | |
|---|---|---|
| 2644576 | 4/1978 | Fed. Rep. of Germany . |
| 2644577 | 4/1978 | Fed. Rep. of Germany . |
| 2646951 | 4/1978 | Fed. Rep. of Germany . |

Primary Examiner—A. D. Pellinen
Assistant Examiner—Geoffrey S. Evans
Attorney, Agent, or Firm—Fleit, Jacobson, Cohn, Price, Holman & Stern

[57] ABSTRACT

An apparatus for displacing a pressure creating piston in a hydraulic chuck. A toggle clamp having a handle is attached to the hydraulic chuck above the pressure piston by a mounting assembly. An adjustable plunger extension mounted on a plunger is movable by the toggle clamp to displace the piston when the clamp handle is pivoted to move the plunger extension to an extended position. By adjusting the extended position of the plunger extension relative to the plunger, the piston displacement can be preselected, and create a predetermined hydraulic pressure for operating the hydraulic chuck which is maintained despite repetitive movement of the plunger between an extended and a retracted position.

26 Claims, 4 Drawing Sheets

FIG. 1 (Prior Art)
FIG. 6
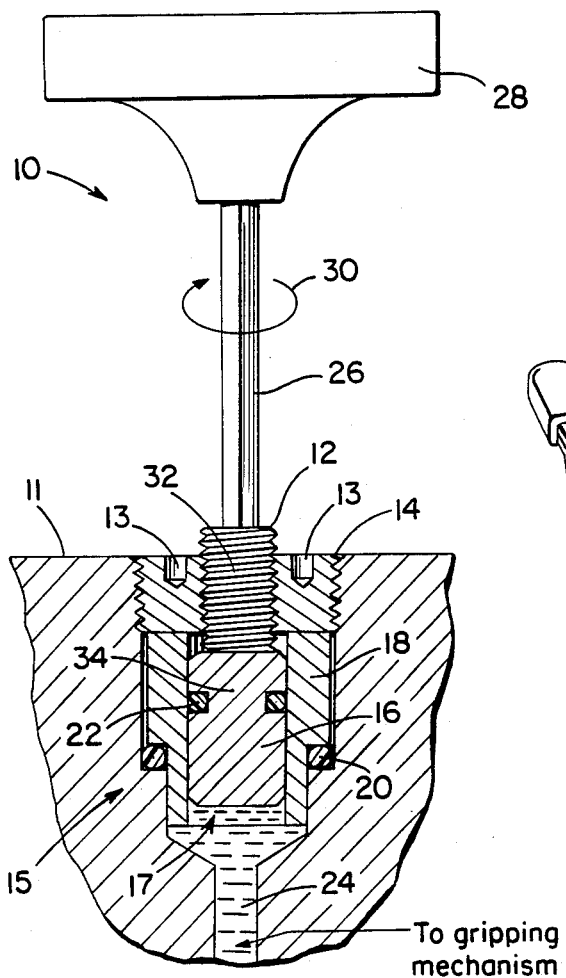
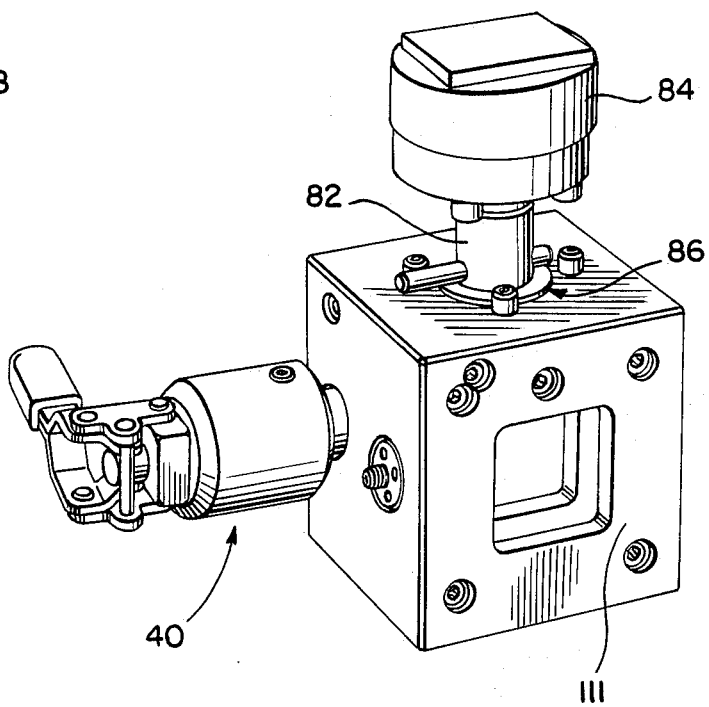
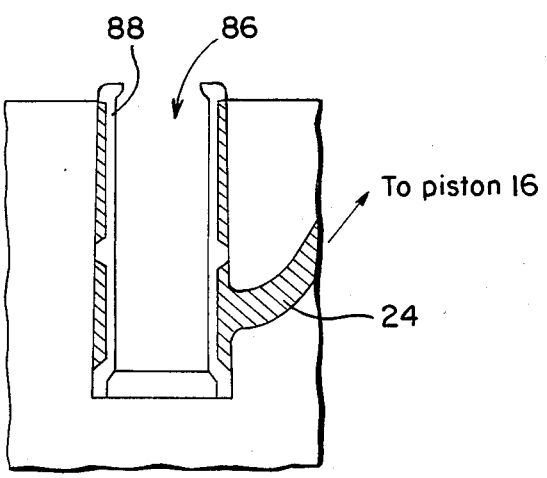
FIG. 7

CLAMPING MECHANISM FOR SECURING AN EDM ELECTRODE HOLDER IN A HYDRAULIC CHUCK

FIELD OF THE INVENTION

The present invention relates to a clamping mechanism for securing an electrical discharge machine ("EDM") electrode holder in a hydraulic chuck. A toggle clamp or over-center clamp moves a plunger and a plunger extension over a constant distance to displace a pressure piston in the hydraulic chuck. The hydraulic chuck thereby securely holds the electrode holder.

BACKGROUND OF THE INVENTION

In the EDM art, the discharge electrode is frequently mounted on an electrode holder which, in turn, is secured in a hydraulic chuck. The hydraulic chuck may be part of a mounting block, which secures the electrode holder. The electrode blank, affixed to the electrode holder, is then formed into the desired electrode shape. Once formed, the electrode holder may then be removed from the mounting block and then mounted in a similar hydraulic chuck in the EDM machine.

When using a hydraulic chuck to securely hold an electrode holder, both during the electrode forming step or the electrical discharge process, it is imperative that the electrode holder be prevented from moving. The application of proper clamping pressure is important because if insufficient clamping pressure is generated, the electrode holder has some play within the hydraulic chuck and thus adversely affects the system precision.

A system for generating a clamping pressure in a hydraulic chuck is described in West German Offenlegungsschrifts 26 46 951, 26 44 577, and 26 44 951. These systems comprise a set screw arrangement, wherein a set screw is accessible on the surface of the hydraulic chuck and communicates with a hydraulic piston via threads in a keeper nut. A hex key or other similar tool is inserted into the set screw and rotated a certain number of turns until the electrode holder is clamped. Generally, the operator remembers the number of turns required to clamp an electrode holder and employs the same method for each of the same diameter electrode holders.

There are several problems associated with this set screw pressure adjustment mechanism. First and foremost, the set screw system is time consuming and imprecise. In many cases, the electrode blank mounted on the electrode holder can be machined faster than the time required to adjust the set screw mechanism for the correct clamping pressure and thereafter releasing the set screw to remove the electrode holder.

Further, an operator must keep track of the number of times he or she has turned the hex key to develop the required clamping pressure. If the operator is distracted during this procedure and forgets how many times the hex key has been turned, the procedure must be restarted; otherwise, continued turning may result in an improper clamping pressure. Furthermore, it is often difficult to establish a known starting point for counting the number of turns the hex key should be rotated. Further yet, even if the operator has rotated the hex key the correct number of turns from an established starting point, there is little guarantee that the correct clamping pressure has been generated. In essence, this clamping procedure must rely on "feel" and is dependent on the experience level and care of the operator.

Another disadvantage of this system is the possibility of losing the hex key or other similar tightening tool. Often, the hex key falls into an oil-filled work tank and requires the operator to fish for the tool in the tank or drain the tank to find the tool.

Other patents related to this field are Ohsima, Hagemeyer et al., and Buck, U.S. Pat. Nos. 3,769,761, 4,533,287, and 3,731,942 respectively.

SUMMARY OF THE INVENTION

The present invention includes a clamping mechanism which is retrofitted into the presently known hydraulic chuck mechanisms which employ a set screw piston displacement system. An extended keeper nut is secured into the mounting threads of the original keeper nut hole. A clamp cap is attached to the extended keeper nut and is secured in this position by three dog-point set screws. A toggle clamp is mounted into the clamp cap via a plunger lock nut. The plunger lock nut is screwed into internal threads in the clamp cap to position the plunger of the toggle clamp within the plunger lock nut. The internally threaded plunger of the toggle clamp includes an extended externally threaded plunger extension which engages a hydraulic piston of a hydraulic chuck. The plunger extension is axially adjustable within the internally threaded plunger via a hex key inserted into an exposed end of the plunger extension, for displacing the piston over variable distances.

The toggle clamp can be rotated to the most convenient operating position by slightly loosening the dog-point set screws in the clamp cap and rotating the clamp cap containing the toggle clamp to the desired position. The keeper nut includes internal threads to receive a set screw if it is desired to remove the clamp cap with the toggle clamp and return to a set screw pressure adjustment mechanism.

It is an object of this invention to provide a device for operating a hydraulic chuck faster, more accurately, and easier than any device heretofore known.

It is an additional object of this invention to provide a device for displacing a pressure piston in a hydraulic chuck a predetermined distance to create a preset hydraulic pressure for clamping an electrode holder in the hydraulic chuck at exactly the same clamping pressure each time it is activated, with the same accuracy from all operators.

It is another object of this invention to provide a device for displacing the pressure piston in a hydraulic chuck, wherein the device is easily adjustable to specific pressure requirements and remains consistent with repeated use by any operator.

It is an additional object of this invention to provide a device for displacing the pressure piston in a hydraulic chuck, wherein the device maintains the piston in its displaced position under extreme stresses without slipping or unlocking.

It is yet a further object of this invention to provide a device for operating a pressure piston in a hydraulic chuck, wherein the device is quickly removable from the hydraulic chuck to return to prior pressure adjusting methods.

The above and other objects and advantages will become apparent when reference is made to the following description, taken in conjunction with the accompanying drawings.

BRIEF DESCRIPTION OF THE DRAWINGS

FIG. 1 is a sectional view of the prior art set screw pressure adjustment mechanism.

FIG. 6 is a perspective view of the inventive clamping mechanism mounted on a hydraulic chuck to secure an electrode holder having an electrode mounted thereon.

FIG. 7 is a partial sectional view of the hydraulic chuck shown in FIG. 6.

DETAILED DESCRIPTION OF THE DRAWINGS

Figure 2:
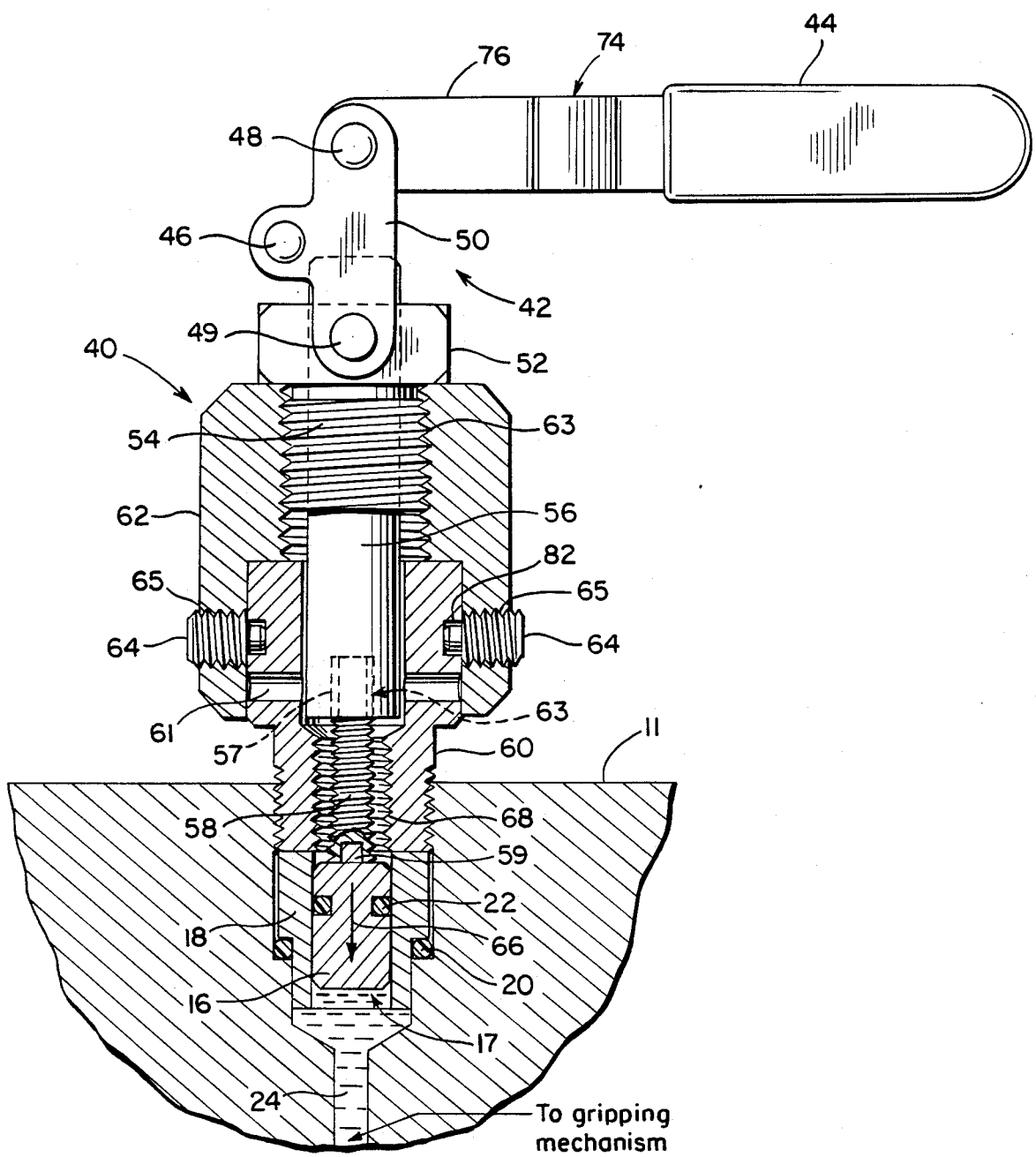
FIG. 2 is a sectional view of the inventive clamping mechanism in its extended position, attached to a hydraulic chuck.

Referring first to FIG. 1, the prior art set screw pressure adjustment mechanism is shown. The set screw system 10 includes a set screw 12 received in a keeper nut 14. The keeper nut 14 is received in threads provided in the body of the hydraulic chuck 11. Recesses 13 are for receipt of the prongs of a keeper nut tightening device. The prongs are received in the recesses 13, and the device is then turned to tighten or loosen the keeper nut.

The hydraulic mechanism 15 includes a piston 16 contained within a hydraulic cylinder 18. The cylinder 18 is mounted within a recess of the hydraulic chuck 11, and hydraulic fluid 24 is sealed by an O-ring 20. The piston 16 is free to move axially within the cylinder 18 and hydraulic fluid is sealed by an O-ring 22 within the piston. The bottom 17 of the piston 16 is in contact with a reservoir of hydraulic fluid 24, such as oil, which leads to, and is in fluid communication with, a gripping mechanism. When the hydraulic fluid receives pressure by the piston movement, the fluid acts on the gripping mechanism to impart pressure, and to secure the electrode holder. The gripping mechanism when in receipt of forces through the hydraulic fluid, acts to physically grip an element associated with the electrode holder. Typically, the electrode holder has a cylindrical shaft which is mounted within the gripping mechanism of the hydraulic chuck. The gripping mechanism is a deformable annular member which surrounds the cylindrical shaft. Hydraulic pressure deforms the annular member into physical and secure gripping engagement with the shaft. A typical gripping mechanism is disclosed in the German Offenlegungsschrifts cited above.

In operation, a hex key 26 is inserted into the set screw 12 and rotated via a handle 28 in the direction as shown by arrow 30 until a resistance is felt. The set screw is then turned a predetermined number of turns to act against, and move, the piston downward, as shown by arrows 32 and 34, to impart pressure on the confined hydraulic fluid 24, which is then delivered under pressure to the gripping mechanism of the hydraulic chuck 11.

Referring now to FIG. 2, the clamping mechanism 40 of the present invention is shown. The clamping mechanism 40 includes a toggle clamp 42. The toggle clamp 42 includes a handle 44 pivotably attached by rivets 48 to link elements 50, only one link element being shown in this Figure for clarity. Toggle clamps are available from Carr-Lane Manufacturing Company, Model CL-150-TPC or DE-STA-CO, Model 602.

Figure 3:
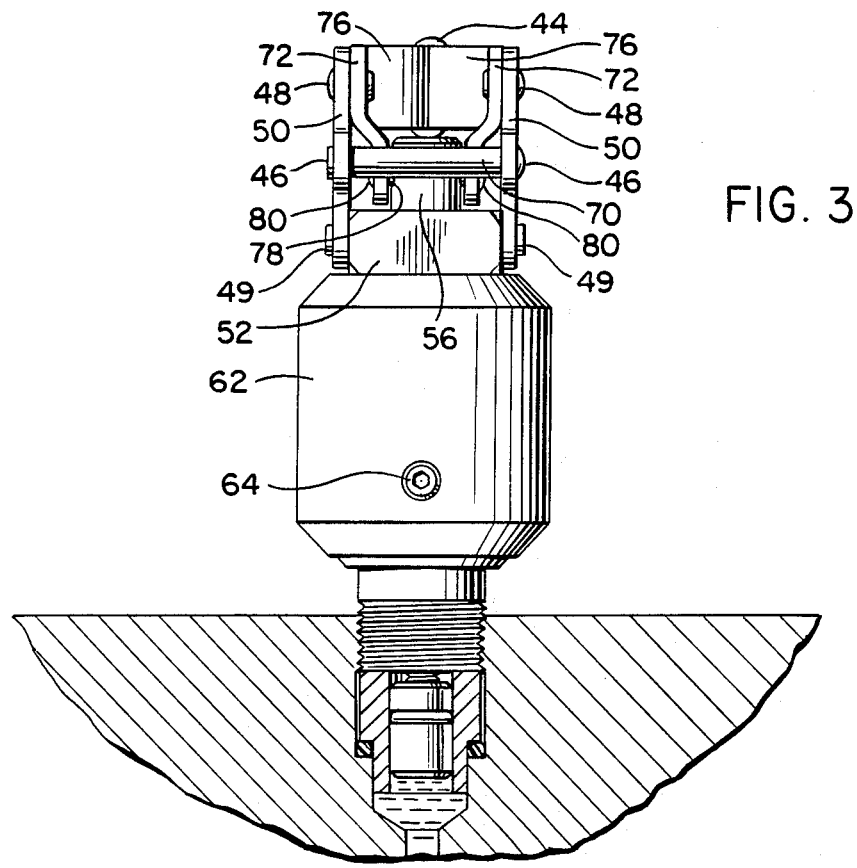
FIG. 3 is a side view of FIG. 2, partly in section.

As shown in FIG. 3, the other link element 50 is identical to the one shown in FIG. 2. The two link elements 50 are spaced from each and interconnected by a shaft 70 terminating at rivet end caps 46. The shaft 70 acts as a stop to terminate travel of the handle in the extended and retracted positions of the plunger.

Short projections 72 and long projections 76 make up L-shaped arms 74 to form pivotable handle 44 of toggle clamp 42. Shaft 70 engages short projections 72 of the L-shaped arms 74. The intersection between short projections 72 and long projections 76 of the L-shaped arms 74 is secured to link elements 50 by upper rivets 48. As shown in FIG. 3, projection 72 is located behind shaft 70 and engaging the shaft 70. Shaft 70 spans between links 50 to limit the continued travel of handle 44 and, therefore, the continued downward extension of plunger 56, connected to plunger extension 58 which displaces piston 16 in a manner as described below.

As shown in FIGS. 2 and 3, the toggle clamp 42 is connected to a plunger lock nut 52 having an externally threaded plunger guide 54. The plunger guide 54 is screwed into a clamp cap 62, described below. A plunger 56 is slidably mounted in the plunger guide 54. The plunger 56 is connected, at an upper end, to the projections 72 by rivets 80. The lower rivets 49 pivotably connect the links 50 to plunger lock nut 52.

The plunger 56 includes internal threads 57. A plunger extension 58 is threadingly engaged with the internal threads 57. The plunger extension 58 is axially adjusted within the plunger 56 via its rotation relative to the plunger 56 by a hex key (not shown), which is inserted into an opening 59 within the distal tip of the plunger extension 58. LOC-TITE is applied to the threads of the plunger extension 58 at 63 so that the threaded connection with plunger 58 is in a resistance fit and will not move during normal usage.

As shown in FIG. 3, a rivet shaft 78 extends through the upper end of plunger 56 and interconnects the terminal ends of projections 72 to the upper end of plunger 56. Rivet ends 80 of rivet shaft 78 are shown projecting from the terminal ends of projection 72.

Returning now to FIG. 2, the elements for attaching the inventive clamping device to the hydraulic chuck 11 will now be described. First, with reference to FIG. 1, the set screw 12 is unthreaded from keeper nut 14. Keeper nut 14 is subsequently unthreaded and removed from chuck 11. Extended keeper nut 60 is then threaded into the chuck 11 by inserting a narrow elongated tool into through bore 61 in the keeper nut 60. The keeper nut is rotated by movement of the tool to screw the keeper nut into the chuck 11 until the keeper nut contacts the top edge of cylinder 18.

A clamp cap 62 having internal threads 63 is placed over and around the top portion of the keeper nut 60. Three dog-point set screws 64 are adjusted within radially extending ports 65 to engage annular recess 82 to secure the clamp cap 62 to the keeper nut 60. The threaded plunger guide 54 is inserted into the clamp cap 62 and screwed into internal threads 63 to mount the toggle clamp 42 on the clamp cap.

In operation, the threaded plunger extension 58 is adjusted to a desired setting for displacement of the piston 16 to a position determined to lock an electrode holder in the hydraulic chuck 11. Initial axial adjustment of plunger extension 58 is required to determine the amount of axial displacement of plunger extension 58 into an actuated position by movement of the toggle clamp. However, once the desired position of the plunger extension 58 has been set, the movement of the plunger extension is precisely reproduced with each movement of the toggle clamp from the extended position to the retracted position and returning to the extended position.

To displace the piston 16 into its extended position, the handle 44 of the toggle clamp 42 is moved to the position shown in FIGS. 2 and 3. The pivotal movement of the handle 44 to the horizontal position as shown in FIG. 2 causes the piston 16 to move downward, as shown by arrow 66, and thus impart compressive forces on the confined hydraulic fluid 24. The extent to which the piston 16 is constantly displaced is determined by the axial position of the threaded plunger extension 58 relative to the plunger 56. The plunger extension 58 is preadjusted in axial position with respect to the plunger 56. Preferably, the extension 58 is adjusted so that, in operation, a resistive pressure starts to be felt by engagement of the plunger extension 58 against the piston 16 when the handle 44 is at an angle of approximately 45°.

After proper positioning of the plunger extension 58, the plunger 56 is extended until stopped from further downward movement. Once the engaged piston 16 is moved to its farthest point, the pressure of the hydraulic fluid 24 is maintained since the toggle clamp 42 is locked in an extended position and does not unclamp by itself, even under machining stress. It is not possible to overpressure the hydraulic chuck system since intentionally weakened spots of the chuck will expand to compensate for overpressurization.

Therefore, as long as the handle 44 is moved to the extended position for the plunger extension 58, the gripping mechanism of the hydraulic chuck 11 will be maintained in its clamped position by the constant pressure of the hydraulic fluid 24. The only way to release the pressure is to pivot the handle 44 through approximately 180° of rotation to the retracted position for plunger extension 58, as shown in FIGS. 4 and 5.

Figure 4:
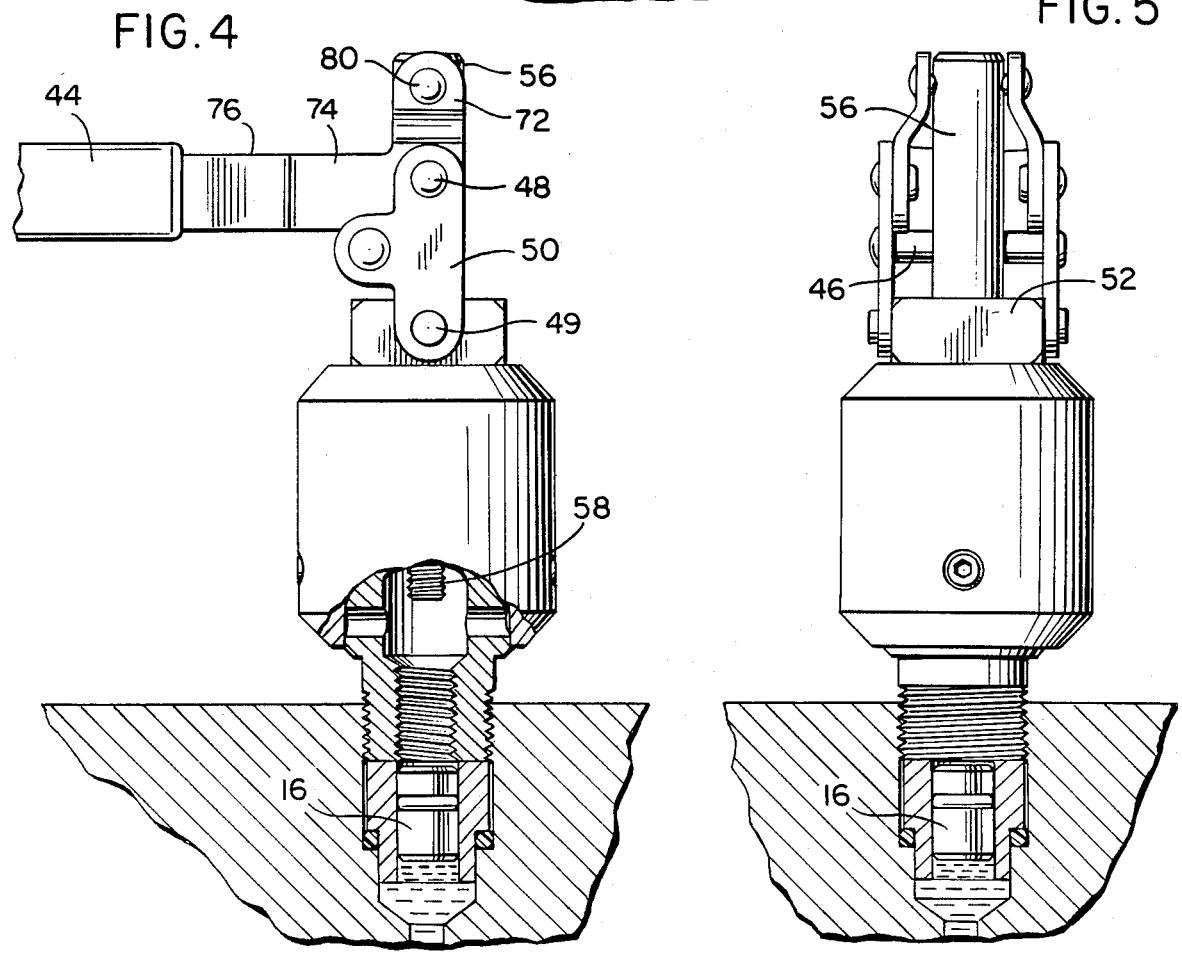
FIG. 4 is a partial sectional view of the inventive clamping mechanism in its retracted position.
Figure 5:
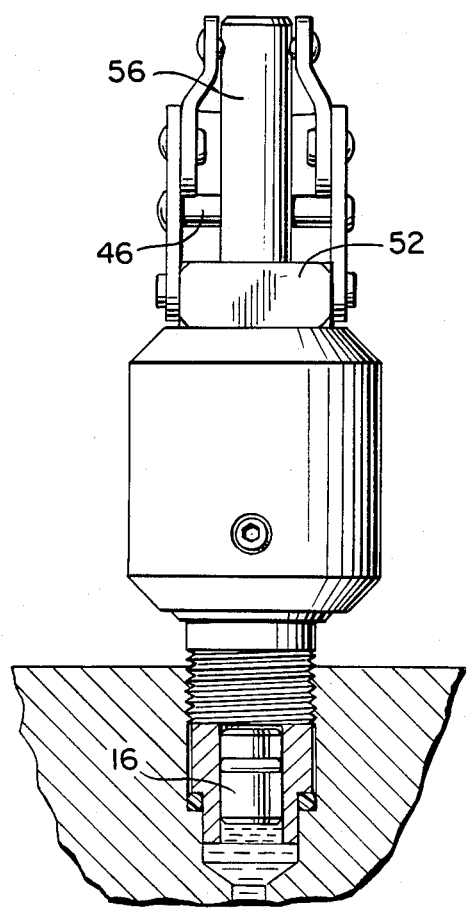
FIG. 5 is a side view of FIG. 4, partly in section.

With reference to FIGS. 4 and 5, FIG. 4 shows the handle 44 and L-shaped arms 74 having projections 76 and projections 72 in a position approximately 180° from that of FIGS. 2 and 3. As noted in FIG. 5, the plunger 56 is withdrawn considerably from the plunger lock nut 52; and, therefore, as shown in FIG. 4, the plunger extension 58 is retracted away from the piston 16. In the retracted position of the plunger extension 58, the shaft 70 also acts as a stop by engaging projections 72 of L-shaped arms 74 to prevent continued travel of the L-shaped arms 74.

In FIGS. 6 and 7, a hydraulic chuck within a mounting block 11 is shown with an attached clamping mechanism 40 in the extended position. An electrode holder 82 is mounted within a cavity 86 of the chuck. The hydraulic chuck is a 3R Mini Block (3R-321.46) available from System 3R, U.S.A., Cedar Grove, New Jersey. An electrode blank 84 is mounted on the electrode holder 82. The cavity 86 is defined by the annular member 88 of the gripping mechanism. The hydraulic reservoir 24 surrounds the gripping mechanism and is shown in FIGS. 1 and 2 in communication with a passageway 17 defined within hydraulic cylinder 18. Piston 16 is axially movable within passageway 17 for imparting compressive forces on the fluid in the hydraulic reservoir.

If it is desired to change the clamping pressure applied to the clamping mechanism, the clamp cap 62 with attached toggle clamp is removed from the keeper nut 60, and the threaded plunger extension 58 is repositioned. To create more clamping pressure, and thus drive the piston 16 and clamping mechanism further, the threaded plunger extension 58 is turned counterclockwise via a hex key so that it extends further axially out of the plunger 56. To decrease the clamping pressure, and thus decrease the extent of pressure on the piston by the clamping mechanism, the threaded plunger extension 58 is turned clockwise, axially into the plunger 56.

Often, there will be times when there is very little clearance available to rotate the clamp handle 44. Therefore, the three dog-point set screws 64 can be loosened and the clamp cap 62, can be swiveled to the desired position where there is enough room to rotate the clamp handle 44 between the extended and retracted position of the plunger extension 58.

The keeper nut 60 has internal threads 68 to receive a set screw 12 if it is desired to return to the set screw piston displacement system 10 shown in FIG. 1. To this end, the dog-point screws 64 are loosened to remove the clamp cap 62 from the extended keeper nut 60. Thereafter, the set screw 12 can be inserted into the extended keeper nut 60 and received by the internal threads 68. Once the set screw 12 is in place in the keeper nut 60, the manual turning of the set screw for the piston displacement procedure is followed, as described in conjunction with FIG. 1.

While the piston displacement system of the present invention is described for use with a hydraulic chuck, it is envisioned that the device of the present invention can be used in any hydraulically actuated system where the displacement of a pressure-creating piston determines the amount of pressure on a confined pressure fluid for operating a clamping mechanism. Therefore, the dimensions of the elements of the present invention may vary, depending on the type of hydraulic system. The extended keeper nut 60 can be modified to various sizes to fit into receiving threads or recesses of various sizes. In addition, the size and type of toggle clamp used may vary depending upon the application, but it is anticipated that the minimum holding capacity for a clamp used in the piston displacement mechanism of the present invention is 200 lbs.

The above description is intended by way of example only and is not intended to limit the present invention, except as set forth in the following claims.

I claim:

1. An apparatus for gripping an EDM electrode holder, said apparatus comprising:
    a hydraulic chuck including a gripping mechanism, hydraulic fluid in communication with said gripping mechanism and a displaceable piston to impart compressive forces to the hydraulic fluid, and
    a clamping mechanism including a toggle clamp with a handle and a plunger displaceable a predetermined distance upon movement of said handle, said plunger being associated with said piston to displace said piston.

2. An apparatus for gripping an EDM electrode holder as in claim 1, wherein said plunger includes a first portion connected to said handle and a second portion adjustable mounted on said first portion to vary the piston displacement upon movement of said handle.

3. An apparatus for gripping an EDM electrode holder as in claim 2, wherein said second portion is movable between an extended position and a retracted position by movement of said handle so that when said handle is in one position, said first portion displaces said second portion to contact and displace said piston.

4. An apparatus for gripping an EDM electrode holder as in claim 2, wherein said first portion includes internal threads along its length and said second portion includes external threads along its length received by said internal threads of said first portion, so that said second portion is axially movable relative to said first portion by rotation of said second portion.

5. An apparatus for gripping an EDM electrode holder as in claim 1, wherein said clamping mechanism includes mounting means for mounting said toggle clamp on said hydraulic chuck.

6. An apparatus for gripping an EDM electrode holder as in claim 4, wherein said mounting means includes a keeper nut threadingly engaging said hydraulic chuck and a clamp cap adjustably secured to said keeper nut, said toggle clamp being mounted on said clamp cap.

7. An apparatus for gripping an EDM electrode holder as in claim 6, wherein said clamp cap is adjustably secured to said keeper nut by set screws engaging said keeper nut so that when said set screws are tightened, said clamp cap is fixed to said keeper nut, and when said set screws are loosened, said clamp cap is movable relative to said keeper nut to allow said clamp cap to be swiveled through 360° relative to said keeper nut.

8. An apparatus for displacing a piston to impart compressive forces upon a confined hydraulic fluid in a hydraulic chuck, said apparatus comprising:
 a plunger,
 a toggle clamp assembly having a clamp handle connected with one end of said plunger,
 a plunger extension adjustably mounted to the other end of said plunger for axial adjustment relative to said plunger, and
 mounting means for mounting said toggle clamp assembly and said plunger on said hydraulic chuck, said plunger extension being movable between an extended and a retracted position through said mounting means by movement of the clamp handle so that when the clamp handle is in one position, said plunger displaces said plunger extension to contact and displace the piston of said hydraulic chuck, thus creating a constant hydraulic pressure dependent on the position of said plunger extension relative to said plunger.

9. The apparatus of claim 8, wherein said plunger includes internal threads along its length and said plunger extension includes external threads along its length received by said internal threads of said plunger, so that said plunger extension is axially adjustable relative to said plunger by rotation of said plunger extension.

10. The apparatus of claim 8, wherein said mounting means is removably mounted on said hydraulic chuck.

11. The apparatus of claim 8, wherein said toggle clamp assembly is removable from said hydraulic chuck while maintaining said mounting means mounted on said hydraulic chuck.

12. The apparatus of claim 8, wherein said mounting means includes a keeper nut threadingly engaging said hydraulic chuck and said toggle clamp assembly includes a clamp cap adjustably secured to said keeper nut.

13. The apparatus of claim 12, wherein said clamp cap is adjustably secured to said keeper nut by set screws engaging said keeper nut so that when said set screws are tightened, said clamp cap is fixed to said keeper nut, and when said set screws are loosened, said clamp cap is movable relative to said keeper nut to allow said clamp cap to be swiveled through 360° relative to said keeper nut.

14. The apparatus of claim 13, wherein said toggle clamp assembly further includes a plunger guide surrounding said plunger and having external threads, and said clamp cap having internal threads to receive said external threads of said plunger guide so that when said plunger guide is screwed into said mounting cap, said plunger guide is firmly held in position.

15. The apparatus of claim 14, wherein said keeper nut has internal threads of a greater diameter than a diameter of said plunger extension to receive a set screw so that rotation of said set screw in said keeper nut in one direction causes said set screw to axially move within said keeper nut to displace said piston, and rotation of said set screw in the opposite direction causes said set screw to retract and, therefore, allows said piston to retract.

16. An apparatus for displacing a piston which imparts compressive forces upon a confined hydraulic fluid in a hydraulic chuck, said apparatus comprising:
 a plunger,
 a toggle clamp assembly having a clamp handle connected with one end of said plunger,
 a plunger extension adjustably mounted to the other end of said plunger for axial adjustment relative to said plunger,
 mounting means for mounting said toggle clamp assembly and said plunger on said hydraulic chuck, said mounting means including a keeper nut having external threads to be received by a threaded recess of said hydraulic chuck, and
 a clamp cap surrounding said keeper nut and including set screws engaging said keeper nut to adjustably secure said clamp cap to said keeper nut and said toggle clamp assembly being secured to said clamp cap to firmly hold said toggle clamp assembly on said keeper nut.

17. The apparatus of claim 16, wherein said plunger includes internal threads along its length and said plunger extension includes external threads along its length received by said internal threads of said plunger, so that said plunger extension is axially movable relative to said plunger by relative rotation of said plunger extension.

18. The apparatus of claim 16, wherein said clamp cap is secured to said keeper nut when said set screws engage said keeper nut, and said clamp cap is movable relative to said keeper nut when the set screws are loosened to allow said clamp cap to be swiveled up to 360° relative to said keeper nut.

19. The apparatus of claim 16, wherein said toggle clamp assembly further includes a plunger guide surrounding said plunger and having external threads, and said clamp cap having internal threads to receive said external threads of said plunger guide to hold said plunger guide in said clamp cap.

20. The apparatus of claim 16, wherein said keeper nut has internal threads of a greater diameter than a diameter of said plunger extension to receive a set screw having external threads to allow said piston to be displaced by rotation of said set screw.

21. Apparatus for clamping an EDM electrode holder, said apparatus comprising:

a hydraulic chuck including a cavity for receipt of an EDM electrode holder and a hydraulic reservoir surrounding said cavity for exerting a compressive force on the sidewalls of said cavity to grip an EDM electrode holder in said cavity, passageway means for communicating between said hydraulic reservoir and the exterior of said hydraulic chuck, a piston slidably mounted in said passageway means and at one end of said piston contacting fluid in said reservoir means, a plunger adapted to move towards and away from said piston, a toggle clamp assembly having a clamp handle connected with one end of said plunger, a plunger extension adjustably mounted to the other end of said plunger for axial adjustment relative to said plunger, said plunger extension adapted to engage the other end of said piston for exerting a compressive force on said hydraulic reservoir, said compressive force being transferred to the sidewalls of said cavity to clamp an EDM electrode holder within said cavity, and mounting means for mounting said toggle clamp assembly, said plunger and said plunger extension on said hydraulic chuck so that said plunger extension passes into said passageway means and engages said other end of said piston, said plunger extension being movable between an extended and a retracted position by movement of said clamp handle so that when the clamp handle is in one position, said plunger displaces said plunger extension to contact and displace said piston and thus creating a constant hydraulic pressure dependent on the position of said plunger extension relative to said plunger.

22. Apparatus for clamping an EDM electrode holder as in claim 21, wherein said plunger includes internal threads along its length and said plunger extension includes external threads along its length received by said internal threads of said plunger, so that said plunger extension is axially movable relative to said plunger by rotation of said plunger extension.

23. Apparatus for clamping an EDM electrode holder as in claim 21, wherein said mounting means includes a keeper nut threadingly engaging said hydraulic chuck and said toggle clamp assembly includes a clamp cap adjustably secured to said keeper nut.

24. Apparatus for clamping an EDM electrode holder as in claim 23, wherein said clamp cap is adjustably secured to said keeper nut by set screws engaging said keeper nut so that when said set screws are tightened, said clamp cap is fixed to said keeper nut, and when said set screws are loosened, said clamp cap is movable relative to said keeper nut to allow said clamp cap to be swiveled through 360° relative to said keeper nut.

25. Apparatus for clamping an EDM electrode holder as in claim 24, wherein said toggle clamp assembly further includes a plunger guide surrounding said plunger and having external threads, and said clamp cap having internal threads to receive said external threads of said plunger guide so that when said plunger guide is screwed into said mounting cap, said plunger guide is firmly held in position.

26. Apparatus for clamping an EDM electrode holder as in claim 25, wherein said keeper nut has internal threads of a greater diameter than a diameter of said plunger extension to receive a set screw so that rotation of said set screw in said keeper nut in one direction causes said set screw to axially move within said keeper nut to displace said piston, and rotation of said set screw in the opposite direction causes said set screw to retract and, therefore, allows said piston to retract.

* * * * *